US008647065B2

United States Patent
Hänisch

(12) United States Patent
(10) Patent No.: US 8,647,065 B2
(45) Date of Patent: Feb. 11, 2014

(54) SERVICE LIFT IN WIND TURBINES

(75) Inventor: Ringo Hänisch, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 723 days.

(21) Appl. No.: 12/785,526

(22) Filed: May 24, 2010

(65) Prior Publication Data
US 2010/0310375 A1      Dec. 9, 2010

(30) Foreign Application Priority Data

Jun. 5, 2009   (EP) ..................... 09007483

(51) Int. Cl.
*F03D 11/00* (2006.01)
(52) U.S. Cl.
USPC .................................. 416/146 R
(58) Field of Classification Search
USPC ............. 415/121.3; 187/256, 405, 270, 407
See application file for complete search history.

(56) References Cited

U.S. PATENT DOCUMENTS

| 2008/0190706 A1* | 8/2008 | Franklin ................. 187/251 |
| 2008/0313972 A1* | 12/2008 | Grob et al. ................. 52/40 |
| 2009/0016897 A1* | 1/2009 | Olgaard .................. 416/244 R |
| 2009/0266648 A1* | 10/2009 | Asensio Bazterra et al. . 187/270 |
| 2011/0084491 A1* | 4/2011 | Kassner ..................... 290/55 |

FOREIGN PATENT DOCUMENTS

| CN | 101360878 A | 2/2009 |
| DE | 102006034299 A1 | 1/2008 |
| WO | WO 2004003381 A1 | 1/2004 |
| WO | WO 2004099606 A1 | 11/2004 |
| WO | WO 2008155983 A1 | 12/2008 |
| WO | WO 2009000060 A1 | 12/2008 |

* cited by examiner

Primary Examiner — Nathaniel Wiehe
Assistant Examiner — Jeffrey A Brownson

(57) ABSTRACT

An elevator system for a wind turbine is provided. The elevator system comprises a suspension device and an elevator car. The elevator car is suspended to the suspension device wherein the suspension device is mountable to a mounting section of a nacelle of the wind turbine.

8 Claims, 4 Drawing Sheets

SERVICE LIFT IN WIND TURBINES

CROSS REFERENCE TO RELATED APPLICATIONS

This application claims priority of European Patent Office application No. 09007483.2 EP filed Jun 5, 2009, which is incorporated by reference herein in its entirety.

FIELD OF INVENTION

The present invention relates to an elevator system for a wind turbine. Furthermore, the invention relates to a nacelle for a wind turbine and a wind turbine. Furthermore, the invention relates to a method for lifting an elevator car in a tower of a wind turbine.

ART BACKGROUND

Today, for efficiency reasons, the nacelles of wind turbines are placed on top of high towers. In general high towers mean a higher wind speed and thus higher energy production. Access to the nacelle is normally given via the tower, wherein conventional wind turbine towers comprise ladders (in one or several flights) from the bottom of the tower to the nacelle. Since climbing ladders that high is both fatiguing and dangerous, many modern wind turbines have in addition to the ladder a service-lift installed to the tower.

Depending on the space in the bottom of the tower, the service-lift ideally has its lowest position on the bottom platform. The service-lift then travels all the way up to the top of the tower. The highest position of the service-lift is determined by the space in the tower top, but also by the height of the service-lift and its suspension beam. To reach the nacelle from the highest landing platform of the service-lift a climbing of further ladders is required. In conventional wind turbines, there may be one ladder flight to the yaw platform and other ladder flights from the yaw platform to the nacelle.

Climbing these ladders is still fatiguing and dangerous but also inconvenient especially if tools or other equipment must be brought to the nacelle. Today, the lifting of the service-lift ends at the top region of the tower so that further ladders are necessary to reach the nacelle.

SUMMARY OF THE INVENTION

It may be an object of the present invention to enable a proper accessibility of a nacelle of a wind turbine.

In order to achieve the object defined above, an elevator system for a wind turbine, a nacelle of a wind turbine, a wind turbine and a method for lifting an elevator in a tower of a wind turbine according to the independent claims are provided.

According to a first exemplary embodiment of the present invention, an elevator system for a wind turbine is provided. The elevator system comprises a suspension device and an elevator car. The elevator car is suspended to the suspension device. The suspension device is mountable to a mounting section of a nacelle of the wind turbine.

According to a further exemplary embodiment of the present invention, a nacelle for a wind turbine is provided. The nacelle comprises a mounting section and an elevator system as described above. The suspension device of the elevator system is mounted to the mounting section.

According to a further exemplary embodiment of the present invention, a wind turbine is provided. The wind turbine comprises a nacelle as described above and a tower, wherein the nacelle is rotatably mounted to the tower.

According to a further exemplary embodiment of the present invention, a method for lifting an elevator car in a tower of a wind turbine is provided. The elevator car is a component of the above-described elevator system.

By the term "suspension device" elements and components may be described that are adapted for suspending the elevator car. The suspension device may comprise in particular a rope for driving or suspending the elevator car, a rope pulley, a rack or other suitable means for suspending and supporting the elevator car. The suspension device is supported and mounted to the mounting section of the nacelle. The mounting section of the nacelle may be for instance a main frame, a housing or a cover of the nacelle. Thus, by mounting the suspension device to the nacelle itself, a higher elevation height for the elevator car is possible, so that the elevator car may be lifted directly to the level of the nacelle. Further ladders may be unnecessary.

By the present invention, the elevator car is suspended to a suspension device that is mounted to the nacelle itself. A technician or other material to be transported may be brought directly to the nacelle, so that there is no need to climb a further ladder in order to reach the level of the nacelle.

In particular, the described elevator system may be installed in nacelles of wind turbines. The wind turbines may comprise a direct drive technique, i.e. without any installations of gear element inside the nacelle. It may be also possible to install the elevator system in wind turbines that comprise a gear box inside the nacelle.

By the present invention, the elevator car is suspended inside the nacelle of the wind turbine, so that the elevator car may be lifted directly to the level of the nacelle. Thus, climbing ladders may be unnecessary. By the present invention, the elevator system provides a safer and less fatiguing climbing and thus a more convenient accessibility of the nacelle for e.g. maintenance purposes or installation purposes. Thereby, the health and the safety for technicians working in the nacelle may be improved.

According to a further exemplary embodiment, the elevator system comprises a driving device. The driving device drives the suspension device for lifting the elevator car. The driving device may be for instance an electromotor, a hydraulic motor or a combustion motor. The driving device may be drivable in a descending and/or lifting direction of the elevator car.

According to a further exemplary embodiment, the suspension device comprises a suspension rope suspending the elevator car. Thus, by providing the suspension rope for suspending the elevator car a cable borne elevator may be provided. Thus, a lightweight and simple lifting technique may be provided by the suspension rope.

According to a further exemplary embodiment, the suspension device comprises a drivable rope pulley to which the suspension rope is rolled up. Thereby, a rope pulley may be installed for driving the elevator car, in particular for lifting and descending the elevator car. It may be sufficient to provide a driving device that may only be adapted for providing a driving force in the lifting direction. The rope pulley may comprise a cable brake for controlling the descending of the elevator car.

According to a further exemplary embodiment, the suspension device comprises a plurality of space suspension ropes for stabilizing the elevator car. Thus, an undesired rotation of the elevator car around the centre of gravity may be prevented so that a guidance for the cable is achieved. Moreover, a fallback system by the plurality of suspension ropes may be provided, so that the safety of the elevator car may be improved.

According to a further exemplary embodiment, the suspension device comprises a guiding rope and a driving rope. The elevator car is suspended to the driving rope and the driving device is fixed to the driving rope. The driving device is movable along the guiding rope for lifting the elevator car. The guiding rope may be fixed to the nacelle. The driving device may be fixed to the elevator car. The driving device may move along the guiding rope and thereby moving up to the nacelle. When moving up to the nacelle along the guiding rope, the driving device lifts the elevator car as well.

Moreover, the driving rope may be rolled around a rope pulley mounted to the mounting section of the nacelle. On the one end of the driving rope the elevator car may be fixed and to the opposed end of the driving rope the driving device may be fixed. The guiding rope may be fixed to the ground and to the nacelle. When the driving device moves along the guiding rope in the direction to the ground, the elevator car may be lifted. By this exemplary embodiment, the elevator car is lifted to the top of the tower when the driving device moves along the guiding rope to the ground. Thereby, when lifting the elevator car, the weight of the driving device itself supports the lifting of the elevator car, so that less driving energy has to be provided. Thus, a more lightweight driving device may be provided.

According to a further exemplary embodiment, the suspension device comprises a rack and a pinion (assembly). The pinion is mounted to the elevator car. The pinion engages with the rack wherein the pinion is drivable for driving the elevator car along the rack. In particular, the rack may be installed to and supported by the nacelle and may lead to the ground. The rack may be designed strong enough for supporting the elevator car. The driving device may be installed to the nacelle or to the elevator car itself for driving the pinion. If the pinion is driven and rotated, the elevator car moves along the rack to the ground or to the nacelle. Thus, a rigid suspension device may be provided without the risk of twisting of the elevator car and with a reduction of vibrations in comparison to the suspension with the ropes.

The rack may be additionally supported by the tower of the wind turbine (e.g. by spacer elements or supporting beams) and the rack ends may end at the nacelle, so that the elevator car may reach the level of the nacelle.

According to a further exemplary embodiment, the nacelle further comprises a working platform. The elevator car is liftable up to the working platform. With the working platform all systems of interest that have to be maintained may be reachable. Thus, when the elevator car reaches the working platform of the nacelle, the technicians may reach all systems of interest.

According to a further exemplary embodiment of the nacelle, the mounting section is provided at a main frame of the nacelle or at a cover of the nacelle. When the mounting section is provided at the main frame, a rigid and stiff suspension for the elevator car may be provided. Moreover, in particular when only a small space for installing the elevator device is available, such as in wind turbines with gears in the nacelles, the elevator system or the suspension device may also be installed to the cover of the nacelles so that also in the border areas of the nacelle and elevator system according to the present invention may be installed.

According to a further exemplary embodiment, the nacelle comprises a further driving device. The further driving device is adapted for lifting the elevator car. Thus, additionally or instead to the driving device supported by the elevator system a further driving device supported by the nacelle may be provided. Thus, the elevator system, in particular the suspension device and the elevator car may be exchanged for maintenance purposes wherein the further driving device may still be installed or vice versa. Moreover, the further driving device may provide a redundant system so that when the driving device fails, with the further driving device a lifting of the elevator car may be still possible.

According to a further exemplary embodiment, the nacelle is rotatably mounted to the wind turbine. In particular, the tower of the wind turbine may comprise a centre axis. The suspension device is mounted to the mounting section of the nacelle in such a way that the elevator car is liftable along the centre axis.

When the nacelle is rotatable around the centre axis of the tower and the elevator car is movable along the centre axis, a proper balance of forces may be provided. Furthermore, the rotation of the nacelle with respect to the tower may not lead to a tilt out of the elevator car.

Besides that, the suspension device may be mounted to the nacelle in such a way, that the elevator car is liftable apart of the centre axis of the tower. The elevator car may be lifted in particular outside and parallel of the tower, for instance from a (tail) region of the nacelle opposed to the (nose) region of the nacelle where the wind turbine blades are installed.

The elevator car and the suspension device may rotate with the nacelle around the centre axis of the tower. Moreover, when the elevator car is liftable along the centre axis, the elevator car may be decoupled from the rotation of the nacelle. Thus, the elevator car may be rotatably suspended with respect to the suspension device so that a rotation of the suspension device with the nacelle does not lead to a rotation of the elevator car. Thus, the exit and the entrance of e.g. the elevator car door are always at the same position so that accessing means may be installed easily to the tower or to the nacelle.

According to a further exemplary embodiment, the wind turbine further comprises a guiding element. The guiding element is mounted between the tower and the elevator car in such a way that the elevator car is spaced in a predefined distance from the tower during lifting. Therefore in an exemplary embodiment, the guiding element may comprise rollers that are installed to an inner side of the tower, so that the elevator car may be movable in lifting and descending direction. By the rollers, a predefined space of the elevator car to the rollers may be provided without interrupting the motion of the elevator car along the lifting direction. Thereby, swinging of the elevator car with respect to the tower may be prevented so that no damages to the elevator system may occur.

Depending on the type of the nacelle, the suspension device and the elevator car may be installed to the main frame of the nacelle or to a further supporting frame mounted to the main frame.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
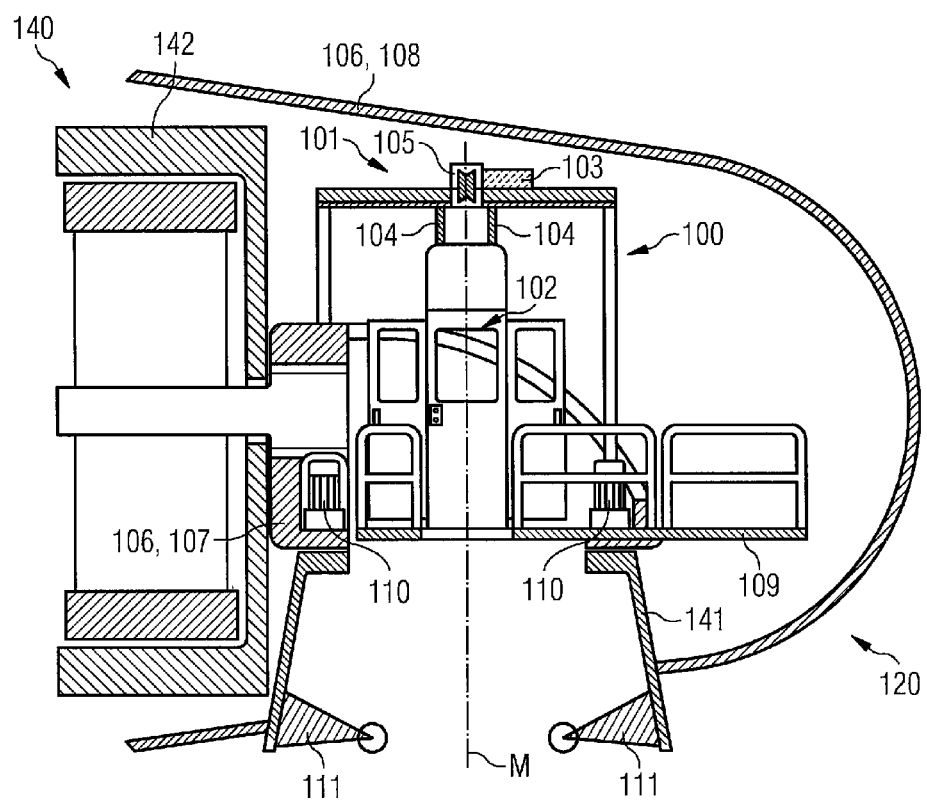
FIG. 1 illustrates a schematical view of an exemplary embodiment of the elevator system according to the present invention.

The illustrations in the drawings are schematically. It is noted that in different figures, similar or identical elements are provided with the same reference signs.

FIG. 1 illustrates an elevator system 100 for a wind turbine 140. The elevator system 100 comprises a suspension device 101 and an elevator car 102. The elevator car 102 is suspended to the suspension device 101. The suspension device 101 is mountable to a mounting section 106 of a nacelle 120 of the wind turbine 140. In FIG. 1 the suspension device 101 may be mountable to the mounting section 106 that may comprise for instance the main frame 107 or the cover 108 of the nacelle. The suspension device 101 may comprise a rope pulley 105 to which the suspension rope may be movably attached. A driving device 103 may drive the rope pulley 105 in order to lift the elevator car 102.

As can be seen in FIG. 1, a plurality of suspension ropes 104 may be provided in order to stabilize the suspension of the elevator car 102.

Figure 4:
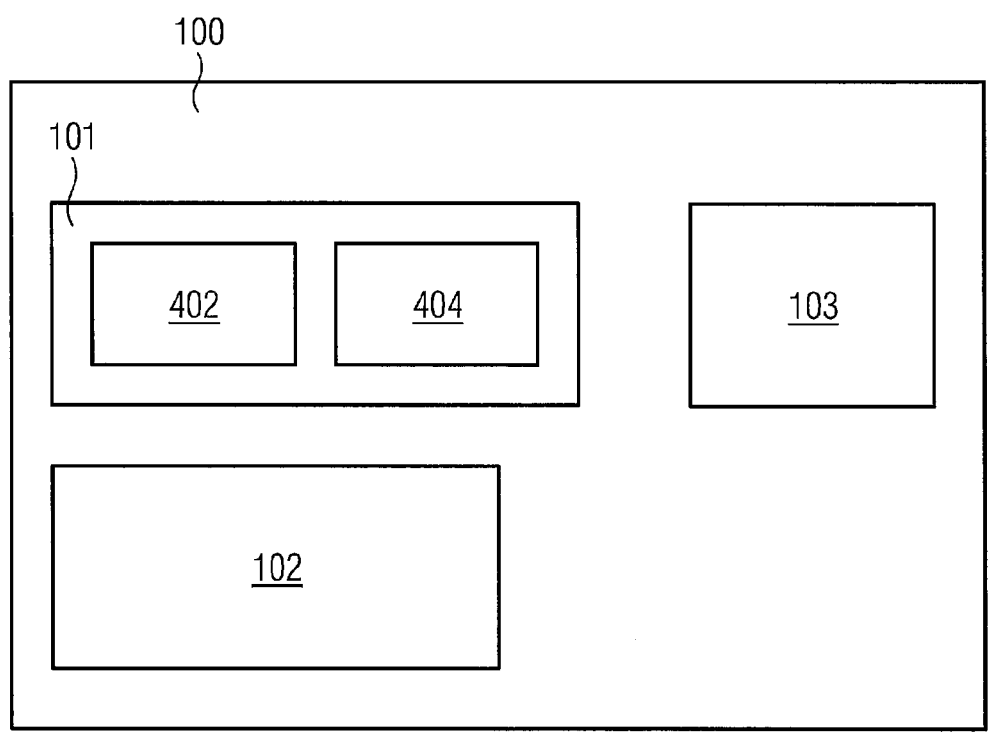
FIG. 4 illustrates a block diagram of yet another exemplary embodiment of the elevator system according to the present invention.

Beside the exemplary embodiment of the suspension device 101 with suspension ropes 104, also a rack and pinion assembly may be installed for suspending and lifting the elevator car 102, as can be seen in FIG. 4.

Figure 2:
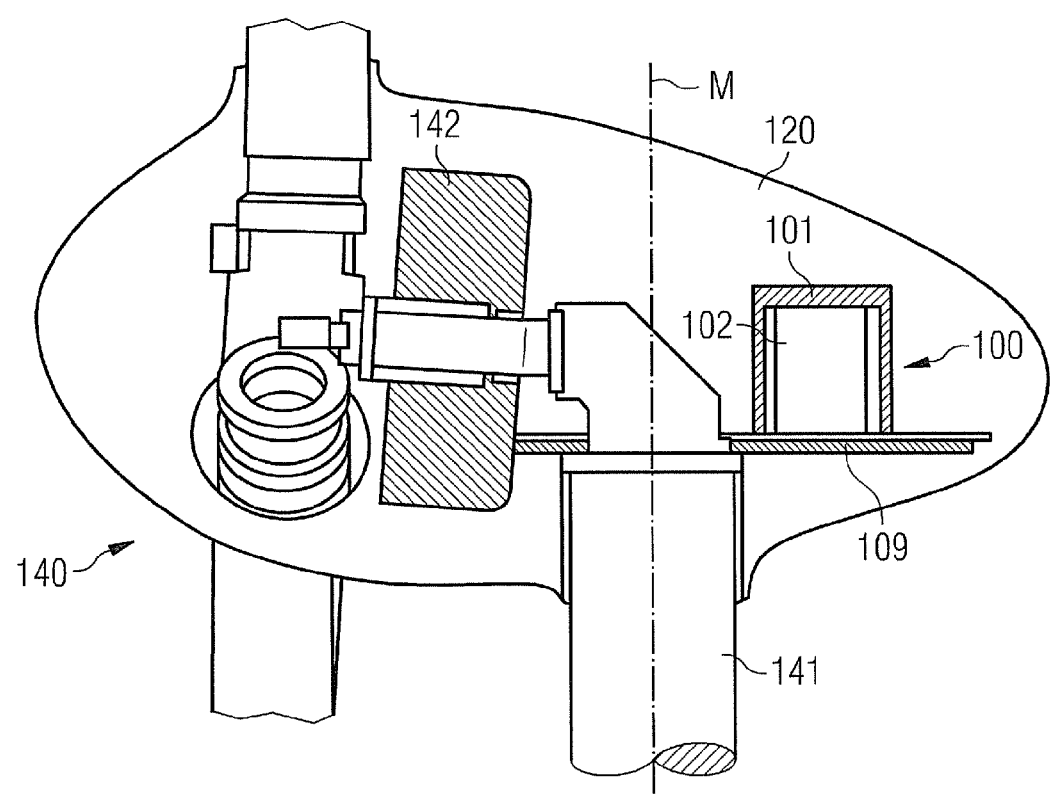
FIG. 2 illustrates a schematical view of a wind turbine comprising an elevator system according to an exemplary embodiment of the present invention.

Referring now to FIG. 4, a block diagram of the elevator system 100 is depicted, according to another exemplary embodiment of the present invention. Various components, which have been already described with regard to FIGS. 1 and 2, are provided with the same reference signs and the description thereof is not repeated here. Further, one or more elements which are depicted in the preceding figures and which are no more shown in the adjoining figure are not necessarily absent, but may not be necessary for the explanation of use of a rack-and-pinion assembly. In this embodiment, the suspension device 101 is implemented using a rack 402 and a pinion 404. The rack 402 and the pinion 404 are operable for suspending and lifting the elevator car 102 based on operation of the driving device 103.

Referring back to FIG. 1, when suspending the elevator car 102 by the suspension device to the nacelle 120, the technician and the components to be transported may be lifted up inside the nacelle 120, e.g. to the level of the working platform 109. Thus, the accessibility to all systems of interest inside the wind turbine 140 and in particular inside the nacelle 120 may be improved.

As can be seen in FIG. 1, the nacelle 120 is rotatably installed at the top of a tower 141. The nacelle 120 may be rotatable around a centre axis M of the tower 141.

In the exemplary embodiment as shown in FIG. 1, the elevator car 102 may be lifted and descended along the centre axis M. Thus, when the nacelle 120 rotates around the centre axis M, the elevator car 102 does not need to rotate with the nacelle 120. Thus, a risk of swinging of the elevator car 102 caused by the rotation of the nacelle 120 may be reduced.

Furthermore, guiding elements 111 may be installed to the tower 141. The guiding elements 111 may comprise rollers, along which the elevator car 102 may be rolled. Thus, the guiding elements may space the elevator car 102 from the tower walls of the tower 141 in a predetermined space. Thus, vibrations and swinging due to a lifting of the elevator car 102 may be reduced.

Moreover, a further driving device 110 may be installed to the nacelle 120. The further driving device 110 may be connected to the suspension rope 104 that is e.g. rolled over a rope pulley 105 to the further driving device 110.

FIG. 1 illustrates a wind turbine 140 comprising a generator 142. Due to the direct drive technology, in particular due to the large diameter of rotor and stator of the generator 142, a further gear device may be unnecessary, so that further installation space for the elevator system 100 may be provided. Besides that, elevator system 100 may also be installed in a nacelle 120 comprising a gear device.

FIG. 2 shows a wind turbine 140 comprising a tower 141 and a generator 142. The nacelle 120 is rotatably mounted to the tower 141. The nacelle 120 may be rotatable around the centre axis M of the tower 141. The elevator system 100 may be installed in a border area of the nacelle 120 spaced apart from the center axis M. Thus, suspension device 101 may suspend the elevator car 102 in such a way, that the elevator car 102 may be descended and lifted outside of the tower 141. The elevator system 100 rotates with the nacelle 120 around the centre axis M. The working platform 109 may provide an accessibility from the elevator car 102 to the generator 142, for example.

Figure 3:
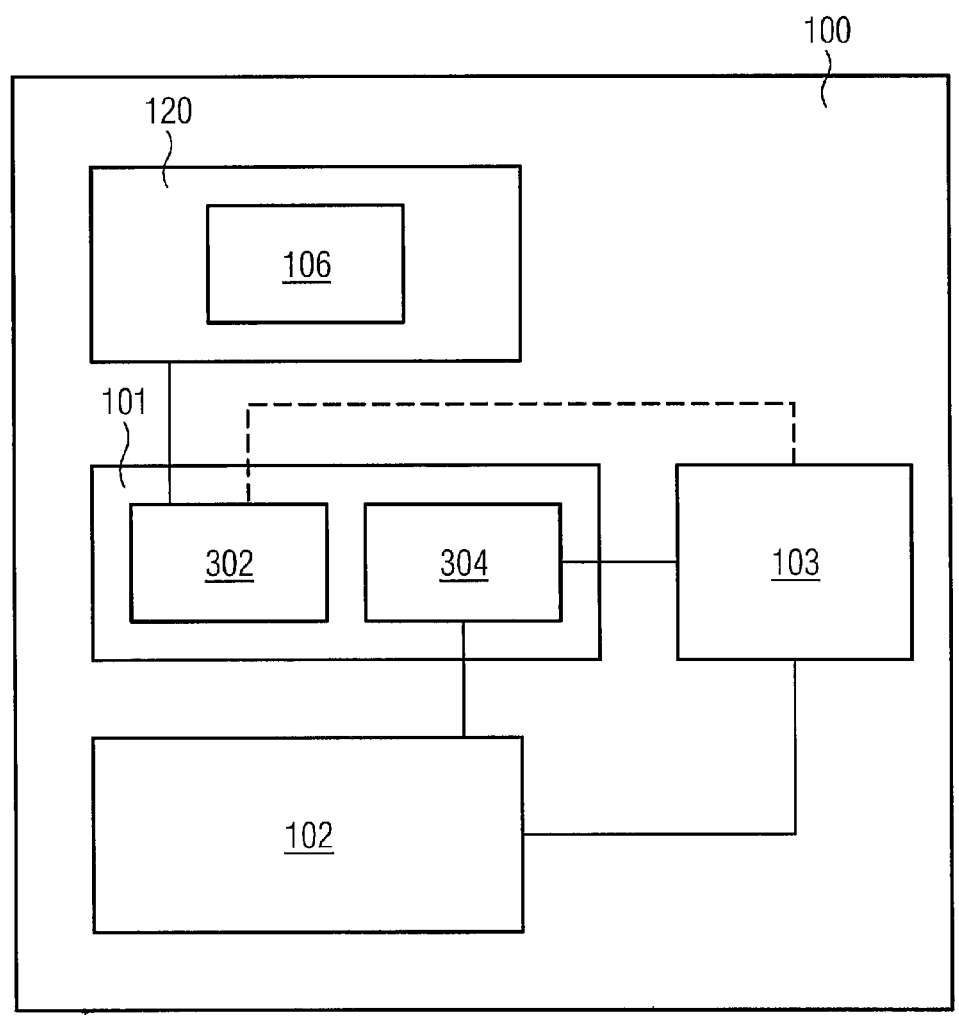
FIG. 3 illustrates a block diagram of another exemplary embodiment of the elevator system according to the present invention.

Referring now to FIG. 3, a block of the elevator system 100 is depicted, according to another exemplary embodiment of the present invention. As can be seen from the adjoining figure, the suspension device 101 includes a guiding rope 302 and a driving rope 304. The elevator car 102 is suspended to the driving rope 304 and the driving device 103 is fixed to the driving rope 304. The driving device 103 is movable along the guiding rope 302 for lifting the elevator car. The guiding rope 302 may be fixed to the nacelle 120. The driving device 103 may be fixed to the elevator car 102. The driving device 103 may move along the guiding rope 302 and thereby moving up to the nacelle 120. When moving up to the nacelle 120 along the guiding rope 302, the driving device 103 lifts the elevator car 102 as well.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A wind turbine comprising:
    a tower with a centre axis,
    a nacelle comprising a mounting section, wherein the nacelle is rotatably mounted to the tower, and an elevator system, the elevator system comprising:
  a suspension device; and
  an elevator car,
wherein the elevator car is suspended to the suspension device,
wherein the suspension device is mounted to the mounting section of the nacelle such that the elevator car is liftable along the centre axis up to an inside of the nacelle, and
wherein the elevator car is rotatably suspended from the suspension device such that the elevator car is decoupled from a rotation of the nacelle.

2. The wind turbine of claim 1, further comprising
a driving device,
wherein the driving device drives the suspension device for lifting the elevator car.

3. The wind turbine of claim 1,
wherein the suspension device comprises a suspension rope suspending the elevator car.

4. The wind turbine of claim 1,
wherein the suspension device comprises a plurality of spaced suspension ropes for stabilizing the elevator car.

5. The wind turbine of claim 1,
wherein the nacelle comprises a working platform,
wherein the elevator car is liftable up to the working platform.

6. The wind turbine of claim 1,
wherein the mounting section is provided at a main frame of the nacelle or at a cover of the nacelle.

7. The wind turbine of claim 1, further comprising
a further driving device, and
wherein the further driving device lifts the elevator car.

8. The wind turbine of claim 1, further comprising:
a guiding element,
wherein the guiding element is mounted between the tower and the elevator car such that the elevator car is spaced in a predefined distance from the tower during lifting.

* * * * *